United States Patent [19]

Kowal et al.

[11] 3,911,409

[45] Oct. 7, 1975

[54] DATA PROCESSING INTERFACE SYSTEM

[75] Inventors: Krzysztof Kowal, Framingham; Leon S. Malone, Jr., Franklin, both of Mass.

[73] Assignee: Honeywell Information Systems, Inc., Waltham, Mass.

[22] Filed: Apr. 23, 1974

[21] Appl. No.: 463,335

[52] U.S. Cl. .......... 340/172.5

[51] Int. Cl.[2] .......... G06F 3/00

[58] Field of Search ....... 340/172.5, 147 R, 147 LP, 340/146.1 C

[56] References Cited

UNITED STATES PATENTS

| | | | |
|---|---|---|---|
| 3,633,169 | 1/1972 | Bickford | 340/172.5 |
| 3,766,524 | 10/1973 | Maring et al. | 340/172.5 |
| 3,815,105 | 6/1974 | Adkins et al. | 340/172.5 |
| 3,818,447 | 6/1974 | Craft | 340/172.5 |
| 3,832,692 | 8/1974 | Henzel et al. | 340/172.5 |

*Primary Examiner*—Charles E. Atkinson

*Attorney, Agent, or Firm*—John S. Solakian; Ronald T. Reiling

[57] ABSTRACT

A data processor is coupled with a plurality of peripheral devices via interface units or boxes, each coupled to one or more of such peripheral devices. The data processor and interface boxes are coupled in a full duplex path coupled in a daisy chained or serial manner so that the interface box furthest from the processor along the path has the lowest priority. Data is transferred in cycles with one output word and a priority word being transferred from the processor during each cycle, and with at least one input word capable of being transferred to the processor during each cycle. Apparatus is included to select the interface box with which data transfer is to be made during a cycle, in response to the priority word of the preceding cycle.

17 Claims, 6 Drawing Figures

DATA PROCESSING INTERFACE SYSTEM

BACKGROUND OF THE INVENTION

The present invention relates to data processing systems and more particularly to interface apparatus between a data processor and a plurality of peripheral devices.

The problem of interfacing a data processor with a plurality of peripheral units has been solved in many ways. Typically, such interface has been implemented by use of parallel data paths wherein all bits of a character or word are transferred between the data processor and the peripheral unit at the same time, i.e. in parallel. Accompanied by the requirement in many systems for such parallel transfer of bits, is the increased cost of not only the hardware in the interface logic but also the added requirement of additional lines in the connections between the processor and such peripheral devices. In order to reduce costs and reduce the complexity of such interface systems, it is sometimes desirable to use a serial type data path between the processor and the peripheral units. This however tends to reduce the response time of the system since each character or word must be transferred bit by bit serially along such data path. In order to minimize such throughput or response time when using such serial transmission, it is accordingly advisable to utilize techniques in the transmission of such data in order to compensate any such inversed response time to the extent possible, while still utilizing minimal logical elements so as to reduce the cost thereof.

It is accordingly a primary object of the present invention to provide a coupling means for interfacing the data processor with a plurality of peripheral devices in a serial manner while still maintaining a relatively fast response time or throughput in the system.

SUMMARY OF THE INVENTION

The above stated objects are achieved according to the present invention by providing a data processing system which includes a data processor and a plurality of peripheral interface boxes, each box for respectively interfacing one or more peripheral devices or units. Coupled between the data processor and such boxes is a full duplex data transfer path serially coupled between the data processor and such boxes so that the box furthest away from the processor on such data transfer path has the lowest priority and so that the box closest to the processor on the data transfer path has the highest priority. The system is organized to transfer data to and from the processor in a full duplexed manner whereby data transferred from the processor is sent in the form of an output word and a priority word during a given cycle and simultaneously during each such cycle, two input words capable of being transferred from one of the interface boxes to the processor. The priority word is utilized to determine the priority of data transfer for the next cycle. Included in each of such interface boxes are means responsive to the priority word for determining the box which will be allowed to transfer data with the processor during the next of such cycles, and accordingly there is further provided means for enabling the box so determined to have priority to transfer data with the processor during the next one of the cycles. The apparatus of the present invention is implemented for response signals in three stages, as represented by a positive current, a negative current, and no current, thereby providing reduced logic requirements while providing a relatively improved response time in the system.

BRIEF DESCRIPTION OF THE DRAWINGS

The above and other objects of the present invention are achieved in the illustrative embodiment as described with respect to the figures in which.

DETAILED DESCRIPTION OF THE PREFERRED EMBODIMENT

Figure 1:
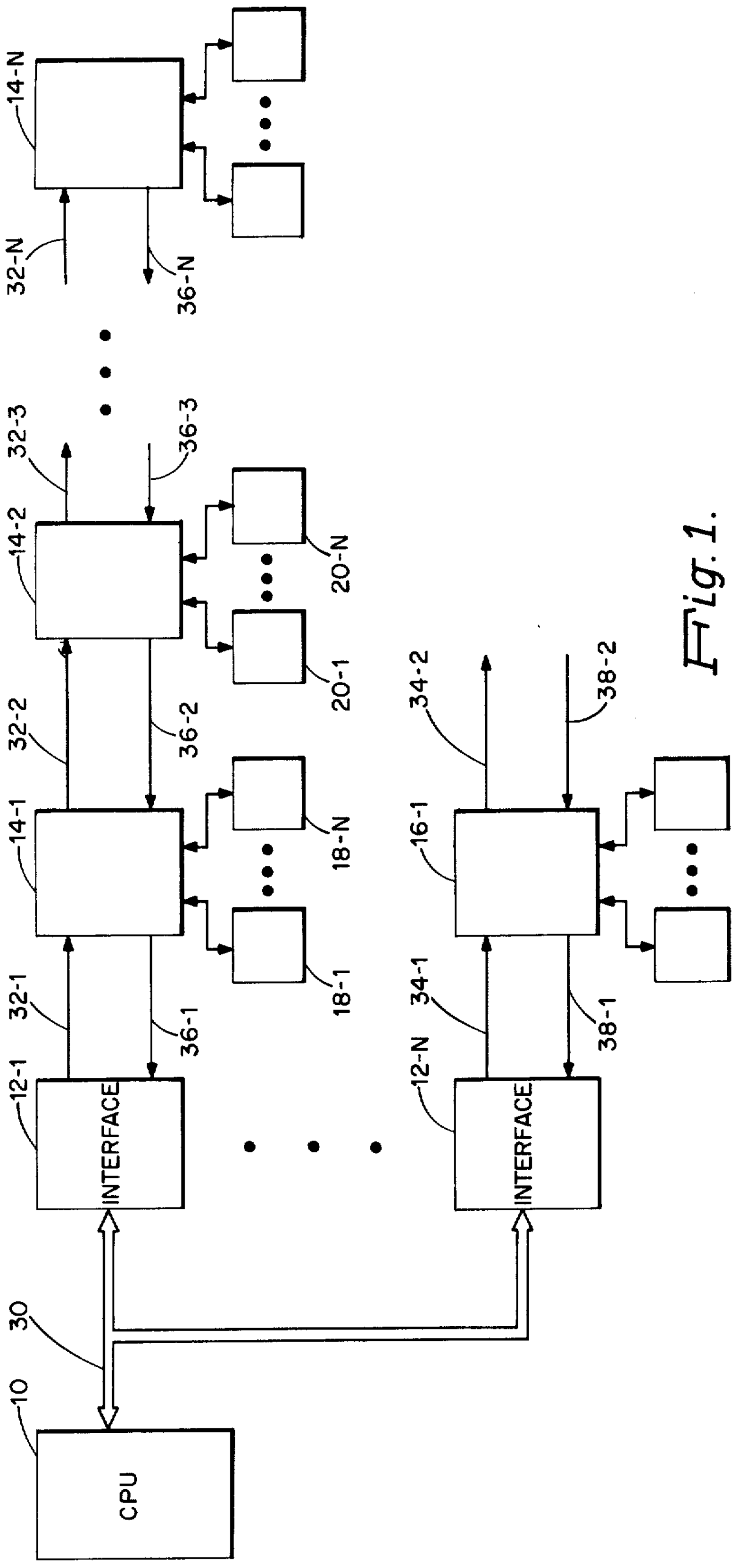
FIG. 1 illustrates the overall system of the present invention.

FIG. 1 illustrates an overall block diagram of the system in which the present invention is used. A processor 10 is coupled with at least one group of interface boxes 14 by means of bus 30 and interface 12-1. Bus 30 is shown coupled to handle bidirectional transfer of data between the processor 10 and interface 12-1. Interface 12-1 is basically a parallel to serial converter so as to convert the parallel bits of a character received on bus 30 to serial bits to be transferred over bus 32-1 through bus 32-N which are daisy chained through interface boxes 14. Interface 12-1 is also coupled to convert bits serially received from bus 36 to bits in parallel or character form for transfer on bus 30. The system may include one or more data transfer paths, i.e., serial or daisy chained paths or busses 32 and 36 all of which allow the full duplex mode of operation of the present invention. In combination, busses 34 and 38 form another complete parallel data path. As indicated, several such parallel full duplex paths may be provided. Coupled with each one of these paths is an interface 12 so that there are interfaces 12 for the N such parallel paths. Coupled with each interface box 14-1 through 14-N as well as 16-1, etc., is one or more peripheral device ranging for example from transducers to display terminals, etc. and indicated in FIG. 1 as devices 18-1 through 18-N coupled with interface box 14-1, and devices 20-1 through 20-N coupled with interface 14-2 and so on.

Figure 2:
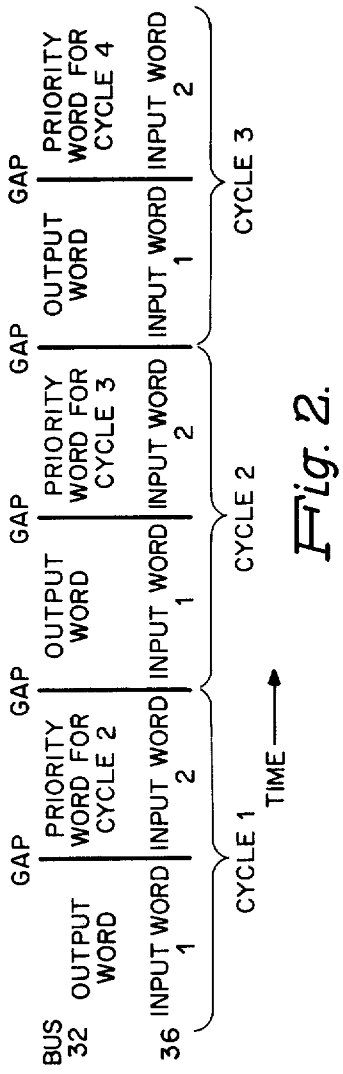
FIG. 2 illustrates the format of the data transfer cycles of the present invention.
Figure 3:
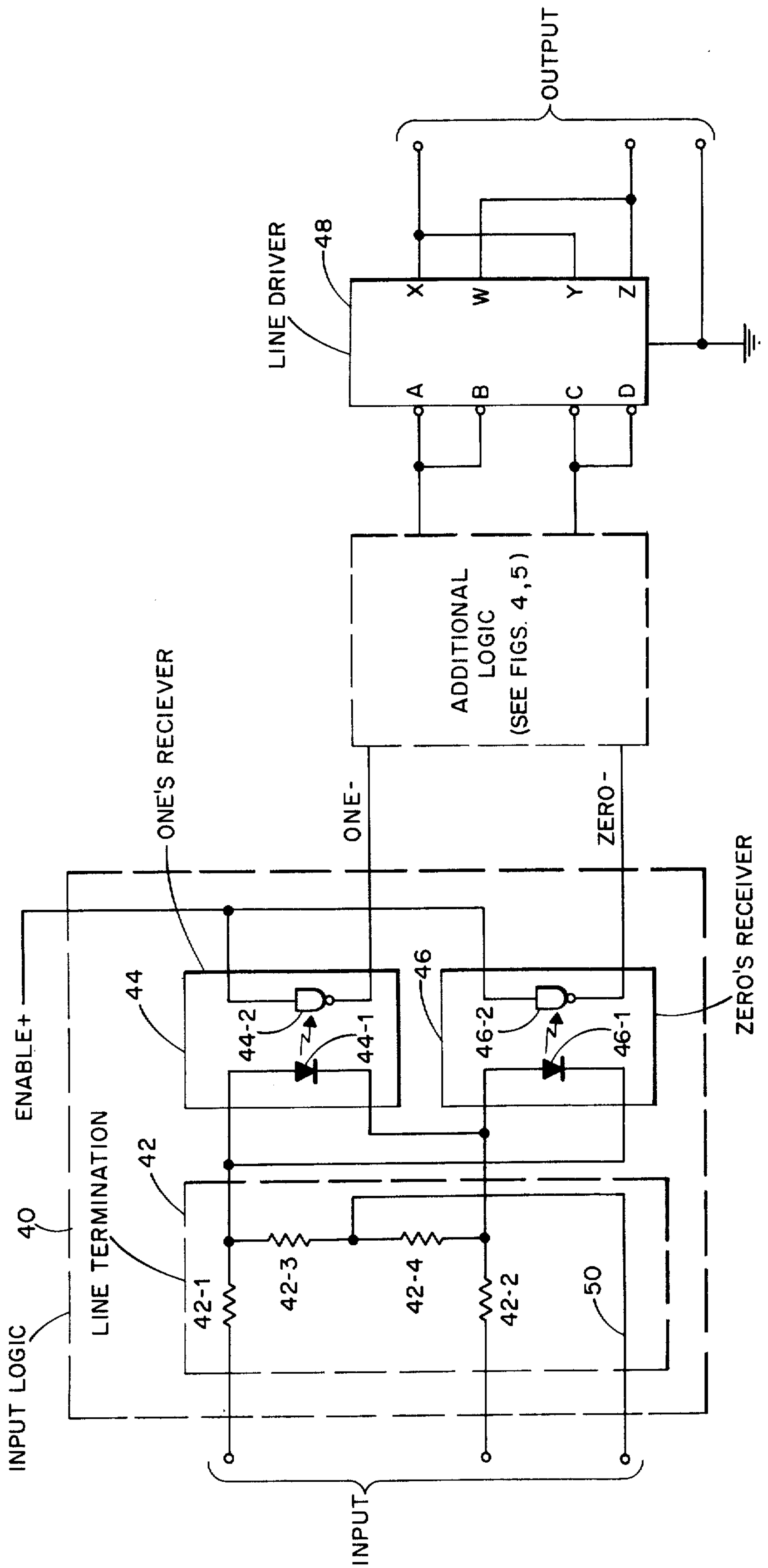
FIG. 3 represents receive and transmit logic used in each box for interfacing with the data transfer paths.
Figure 4A:
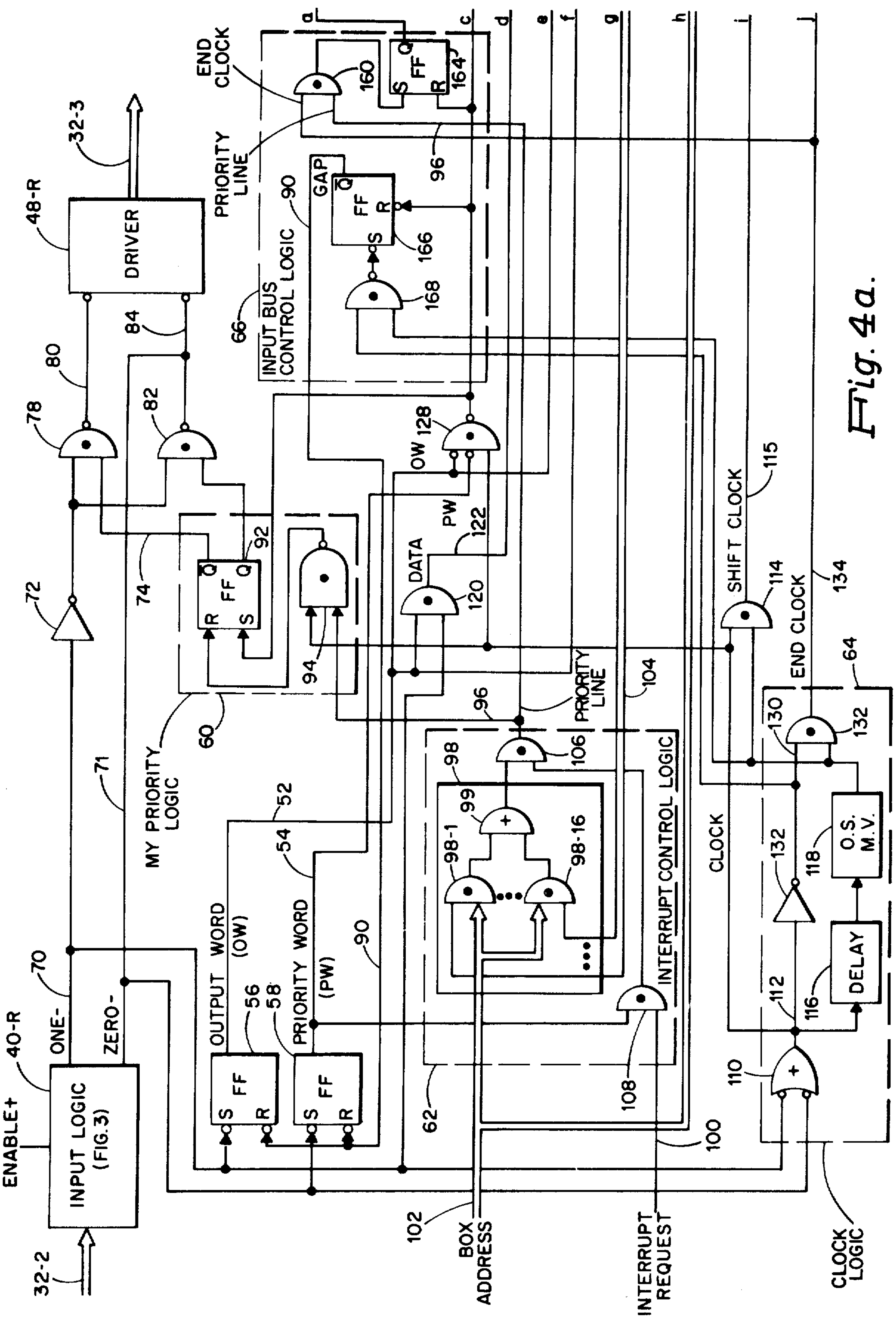
FIG. 4 illustrates the receive logic utilized in each box for receiving data from the data processor.
Figure 4B:
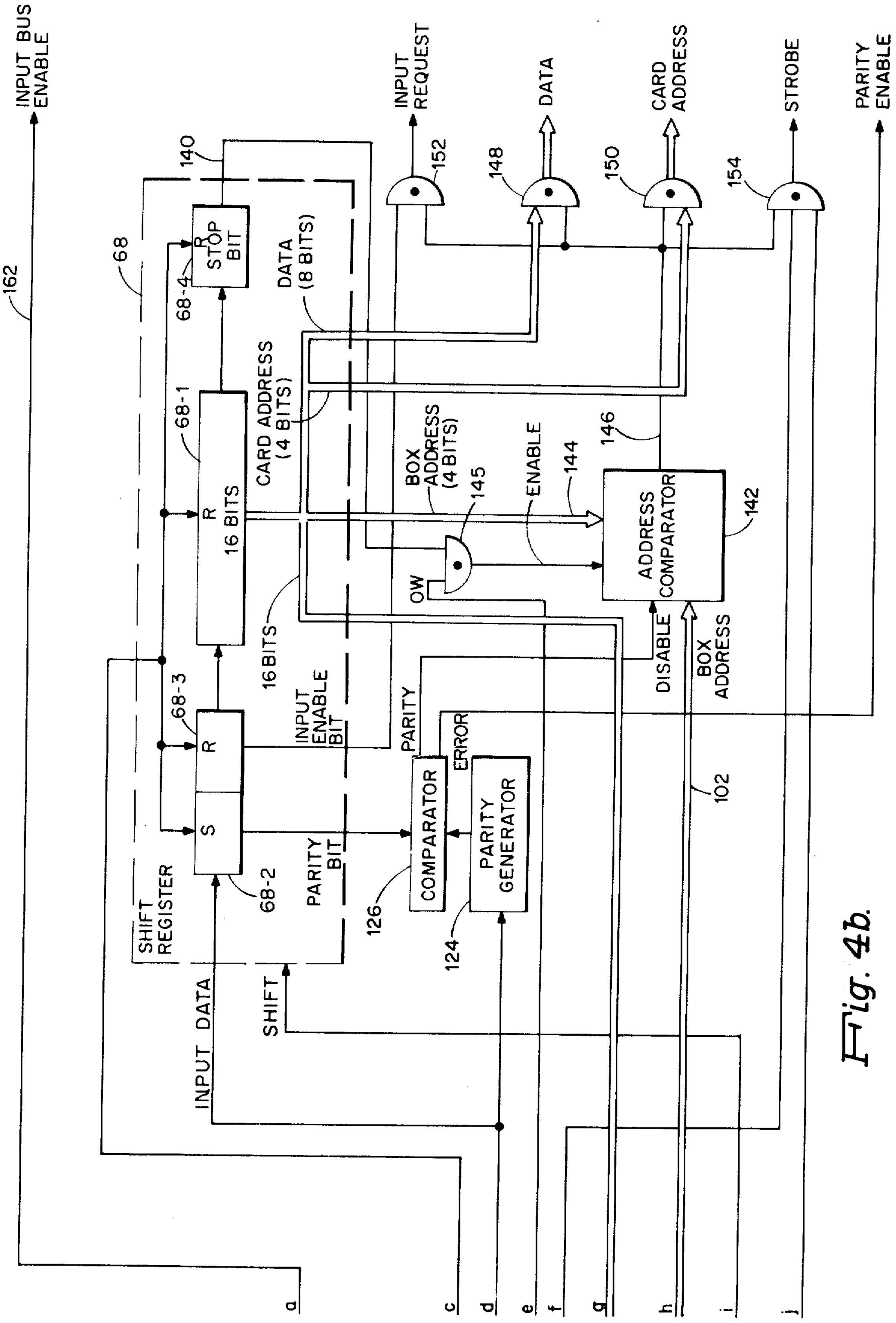
Figure 5:
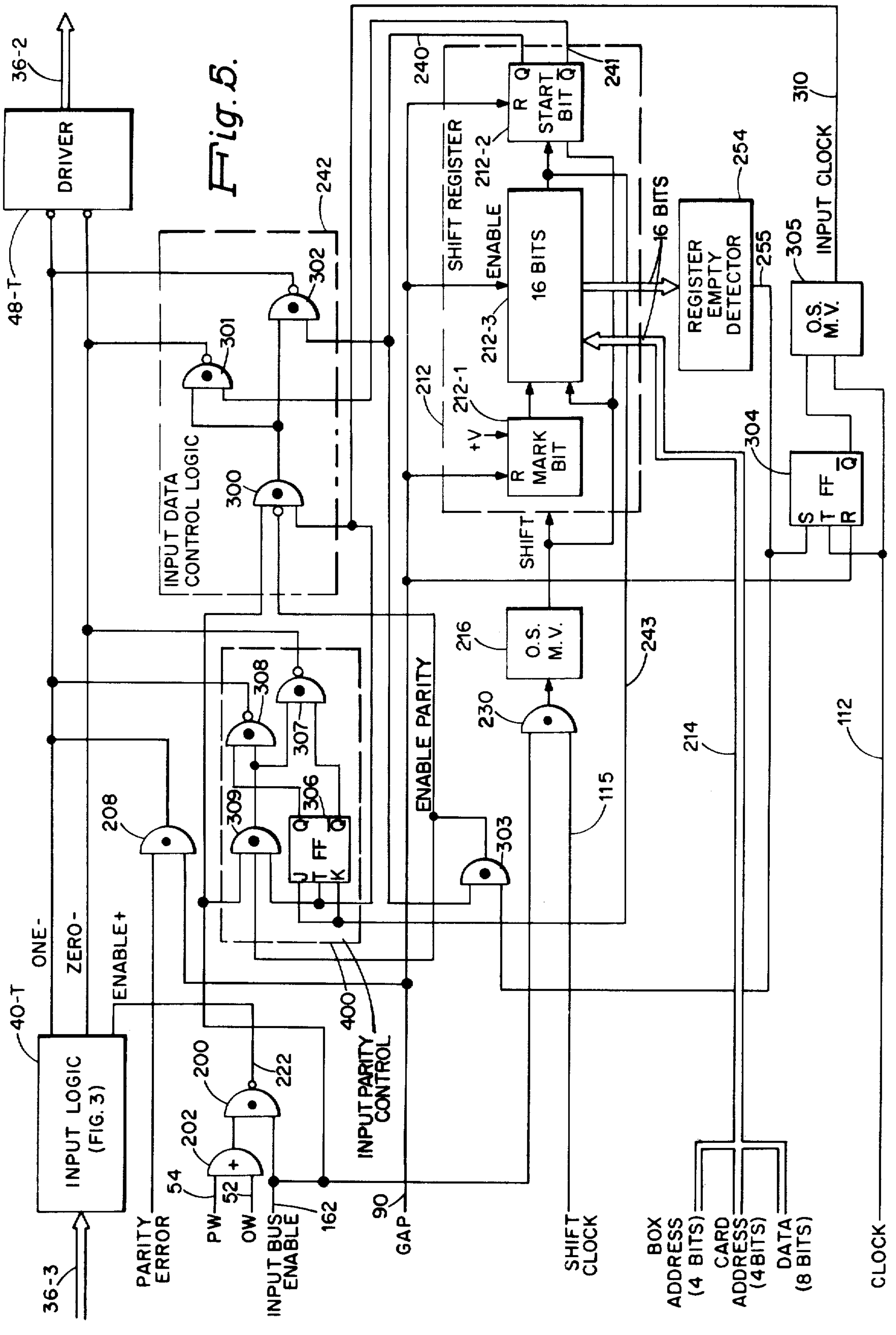
FIG. 5 illustrates the transmit logic used in connection with the present invention.

Each of the interface boxes comprises receive and transmit logic as shown in FIGS. 4 and 5 respectively, the common elements of which are shown in FIG. 3. Thus, data is serially transferred bit by bit from the interface 12-1 for example along bus 32-1 and is received by elements in each of the interface boxes 14-1 through 14-N for further transmittal to the respective peripheral device. For ease of explanation, the data transfer between processor 10 and interface boxes 14-1 through 14-N only will be discussed, it being understood that such operation is similar in the other data paths. In the transmit operation, data is transferred serially by bit along bus 36. The network is arranged so that the highest priority active device seeking to transmit data to the processor 10 blocks data transfer from other lower priority interface boxes until it has so transferred its data. During the receive operation, data from the processor 10 is received by each of the boxes 14-1 through 14-N and is rejected by all except the box which is addressed. Priority determination and acknowledgment is shown pictorially with respect to FIG. 2. As shown in FIG. 2, there are included cycles for the transfer of data. For ease of illustration, only three such cycles are shown. Between each cycle and subcycle, there is shown a gap to be hereinafter explained. On bus 32 for transfer of data from processor 10 to the interface boxes 14, the data will be transferred serially by bit along bus 32 so that in the first subcycle of each cycle, there will be transferred an output word and in the second subcycle there will be transferred a priority word. Thus, as will be seen more specifically, the priority word is used to determine the priority during the next cycle and accordingly during cycle 1 the priority word transferred on bus 32 would be used to determine priority for cycle 2 before cycle 2 occurs. Simultaneously and consistent with the full duplex operation of the present invention, at least two input words may be transferred along bus 36 to the processor 10 from one of the interface boxes 14. This transfer is shown in the form of two input words during each cycle.

As indicated hereinbefore, each interface box includes both receive and transmit logic. Common to such receive and transmit logic as shown in FIGS. 4 and 5 respectively, is the logic shown in FIG. 3 wherein the line termination and isolation units as well as a line driver is shown coupled with the additional logic. With reference to FIG. 3, there is shown input logic 40 which includes the line termination unit 42 and isolators 44 and 46. Also included in the logic of FIG. 3 is the line driver 48 which may be for example the device manufactured by Texas Instruments, Model No. 75,325. The input to the interface box would be received by line termination unit 42 and the output side of the bus would be coupled to the output line of line driver 48. Thus, with reference to interface 14-2 as shown in FIG. 1, the input would be bus 32-2 and the output would be bus 32-3 for the receive portion of interface box 14-2 and the input would be bus 36-3 and the output would be bus 36-2 for the transmit portion of interface box 14-2. The line termination unit 42 may include for example four resistors used for impedance matching. A bit indicating a logical one would be determined in accordance with current flowing in such resistors through resistor 42-1 through the diode element in photocoupler 44, diode element 44-1 included in photocoupler 44, and basically back through resistor 42-2. This would be transferred by means of photocoupler 44 by a voltage zero at the output of the NAND gate 44-2. This voltage zero signal representing a logical one state would result because the ENABLE plus voltage which may be a positive voltage is essentially inverted via the NAND symbol as indicated by the circle at the output of the logic element so that when photocoupler 44 is turned on by such current through diode 44-1, the voltage zero is present on the ONE- line. Similarly for a logical zero representation, current will flow through resistor 42-2, diode element 46-1 of photocoupler 46 and back through resistor 42-1. This will turn on NAND gate 46-2 of photocoupler 46 to present a voltage zero representing a logical one on the ZERO- line. Thus, a logical one on the ONE- line represents a current in one direction and a logical one on the ZERO- line represents a current in the other direction as received by input logic 40. Resistors 42-3 and 42-4 operate in the impedance match, and provide a path to drain current of such currents to wire 50. Thus, the bus connecting each of the interface boxes, such as bus 32-2 would include three wires one of which would be a shield wire. The logical one and zero representations are provided and treated via additional logic as shown in FIGS. 4 and 5 and are applied to line driver 48 for transfer to the typical logic as shown in FIG. 3 of the next interface box, or to the interface 12. The line driver 48 of course need not be included in the last interface box 14-N included in one of the parallel data paths. Similarly, the input logic 40 need not be included in the transmit logic also of the last device 14-N. Thus, signals on the ONE- and ZERO lines as shown in FIG. 3 would be represented by a voltage zero state thereon to identify the respective bit state received on its input. Should there be no current as is the case for a gap, as hereinafter explained, then both the ONE- and ZERO- lines would have voltage one signals.

Now with reference to FIG. 4, the receive logic will be explained for one of the interface boxes, for example, interface box 14-2. The input logic 40 is coupled to receive the three wires of the single bus 32-2. The logic is also shown to include driver 48-R coupled to provide at its output the signals to bus 32-3. It should be noted that drivers 48-R as well as other elements respond to a voltage zero signal at the inputs if such inputs are indicated by the negation inputs as indicated by the circles.

The receive logic includes certain major elements including the output word and priority word lines 52 and 54 which are enabled to so indicate such status by flip-flops 56 and 58 respectively. Also included in the logic of FIG. 4 is a MY priority logic 60 which is utilized to indicate to other interface boxes that this box has, during the transfer of the priority word, requested priority. The priority logic 60 is controlled by means of interrupt control logic 62 which enables the identification of the box requesting priority. Further logic included is the clock logic 64 which is used to generate clock signals used to determine the break between the cycles and subcycles. Also included is input bus control logic 66 in order to generate various bus control functions. A shift register 68 is also included for receiving bits of a word or character in serial form and further logic for transferring such data to the peripheral device by use of a card address which identifies the peripheral device.

More specifically, when line 70 has a voltage one signal thereon, this transfers to the logical one state by means of inverter 72. During the transfer of the priority word, which includes all logical one bits, the states of the two outpus of the MY priority logic 60 are respectively for line 74 a logical zero state and for line 76 a logical one state (during one bit time only if a priority request on line 96 is present). With a logical zero state at one input of NAND gate 78, and a logical one state at the other input, a voltage one state is presented on line 80 to one input of driver 48-R. The voltage one state is not a condition to enable driver 48-R because of the negation input as previously noted. Because both inputs to AND gate 82 are logical ones, accordingly, the output of AND gate 82 on line 84 is a logical one state, i.e. voltage zero, thereby enabling driver 48-R to indicate this voltage zero state to the other interface boxes further away from processor 10. The operation of the other interface boxes down the line will be explained in relationship to the discussion with respect to the interrupt control logic 62. As previously noted, the above discussion with respect to the logic 40 R, logic 60, NAND gate 78, and AND gate 82 and driver 48 R were connected with that situation in which a priority word is being transferred along the data paths and priority request on line 96 was present.

When data is being transferred along the data paths in the form of an output word, MY priority logic 60 is enabled so that a logical one state is present on line 74 and a logical zero state is present on line 76. With a logical one state on line 74 and with current representative of a logical one state bit received by input logic 40-R, the other input to NAND gate 78 will be a logical one thereby providing a voltage zero state on line 80 so that driver 48-R will present a current representative of a logical one state to the next interface box. It is noted that each of the interface boxes will receive such data, as well as the priority word, in their respective shift registers 68. When a logical zero state signal is received and accordingly generated on line 71, then the logical zero signal on line 71 would be directly applied on line 84 to the lower input of driver 48-R for transfer to the other devices by way of a current indicating such logical zero state. It is noted that in such case, the signal state provided on line 71 would override the state of the output of AND gate 82.

With respect to the operation of the priority word indication on line 54 or the output word indication on line 52, in response to the logical one signal received on bus 32-2, flip-flop 56 is set, whereas if a logical zero is so received, flip-flop 58 is set. Both flip-flops 56 and 58 are reset by a signal on line 90 which indicates a gap condition. As indicated hereinbefore for the logical states on lines 74 and 76 of MY priority logic 60, and consistent with such logical states, the output of NAND gate 94 when enabled sets flip-flop 92 of logic 60. NAND gate 94 is fully enabled by means of priority line 96 and clock line 112. During the priority word time and when the subject interface box is requesting an interrupt, if it should be given the status of the highest priority active interface box, then the priority line 96 will be high so as to set flip-flop 92 to provide the logic states for lines 74 and 76 as indicated hereinbefore.

With respect to the interrupt control logic 62, there is included a plurality of gates in logic 98 which enables a high signal state, i.e., logical one state on line 96 when combined with the interrupt request signal on line 100. As indicated hereinbefore, such priority indication is indicated during the priority word time of the cycle. Each interface box includes its own box address which may be provided for example by a thumbwheel switch so as to set the states representing such box address which accordingly is provided on line 102. The box address which be initially four bits may be converted to 16 individual bits representative of such four bits at the input of logic 98 so that each such gate 98 receives one line upon bus 102. Thus the box address on line 102 is coupled for receipt by each of AND gates 98-1 through 98-16 included in logic 98. There are 16 bits included in register 68-1 of shift register 68 and because the system contemplates up to sixteen interface boxes along any given full duplex path. As a so-called start or mark bit is shifted along each one of the stages in register 68-1, as more specifically described hereinafter, such mark bit indication is respectively received at the inputs of AND gates 98-1 through 98-16. That is, when the mark bit is in the first location of register 68-1, the mark bit is received at the first AND gate 98-1 of logic 98 and so on until the mark bit is in the last location of register 68-1 when it is thus received at the last AND gate 98-16 of logic 98. When there is coincidence or comparison between a bit received on bus 104 from register 68-1 and the box address received on bus 102, then the respective one of the AND gates 98-1 through 98-16 generates a signal thereby enabling OR gate 99 to present a logical one signal to one input of AND gate 106 but only for the interface box generating such comparison. If there is an interrupt request by this particular interface box as indicated on line 100 and if a priority word is being transferred, and AND gate 108 will be enabled to provide a logical one state to the other input of AND gate 106 thereby providing a logical one state on priority line 96. As discussed hereinbefore, line 96 is coupled to logic 60 and is also coupled to the input bus control logic 66 as shall be hereinafter discussed.

In order to shift information to the shift register 68, a shift pulse must be generated. In addition, a gap between cycles and subcycles must also be indicated. Clock logic 64 as well as logic 66 is provided for this purpose. In response to either a logical one or a logical zero on lines 70 and 71 respectively, OR gate 110 is coupled to provide a logical one signal on line 112. The logical one signal on line 112 is coupled to one input of AND gate 114 whose output is coupled to provide the shift clock, if the other input of AND gate 114 is also a logical one. In this case, the other input would be a logical one because the delay unit 116 combined with the one-shot multivibrator 118 combines to generate a logical one signal delayed by one bit time. Thus, the only time there will be a logical one indication on the output of one-shot multivibrator 118 without a logical one indication on line 112, will be when a gap is indicated. When a gap is indicated, i.e., when OR gate 110 receives only logical one states at both inputs, the logical level on line 112 will be a logical zero state.

The shift clock is generated, the data received on bus 32-2 is transferred via logic 40-R over line 70 to flip-flop 56 and to AND gate 120 which is enabled when there is an output word indication on line 52 thereby passing the complement of the logical state on line 70 to the input of shift register 68. The data so generated and provided at the input of shift register 68 on line 122 is also provided to parity generator 124 which is utilized to determine the parity for the 16 bits of the received word and to compare such parity by means of comparator 126 with the parity bit received in the first stage 68-2 of shift register 68. This aspect will be discussed hereinafter.

The clock signal on line 112 is also utilized to enable AND gate 128 in the absence of both an output word and a priority word as might be indicated on lines 52 and 54 respectively. In this manner, the flip-flop stages associated with shift register 68 are reset to indicate a logical zero except that the first stage or flip-flop 68-2 is set to indicate a logical one. This is the so-called start or mark bit. The parity bit will be contained in stage 68-2 at the conclusion of the transmittal of the respective word into all the stages of register 68. The signal at the output of AND gate 128 is also utilized to reset the logic of input bus control logic 66. When there is a gap condition, as indicated by the lack of current received on bus 32-2, then as indicated hereinbefore, the logical state of line 112 will be a zero such that the logical one state will be presented on line 130 by means of inverter 132. The logical one state on line 130 combined with the delayed logical one state from the previous bit time at the output of one-shot multivibrator 118, will fully enable AND gate 131 so as to generate an end clock signal on line 134. The end clock signal on line 134 is utilized in conjunction with logic 66 and is also used as a strobe for the receiving peripheral control card, coupled with the respective interface box.

As indicated hereinbefore, when an output word cycle signal is generated thereby enabling AND gate 120 to pass data to the input of register 68, such data is shifted in bit by bit by means of the shift clock generated at the output of gate 114. It is noted that just prior to this as indicated hereinbefore, the initial stage 68-2 of register 68 had been set with a logical one, i.e., the mark bit, and that all the other stages had been reset. Accordingly, as the shift pulses are received by register 68, the mark bit is shifted to the next stage 68-3 and so on until at the conclusion of the receipt of each bit of a word, stage 68-3 will include an input enable bit. In operation, the mark bit in stage 68-3 is received at the first stage of 16 bit register 68-1. When the mark bit is received at the last stage of shift register 68, a stop signal is generated on line 140 which together with the input enable bit in stage 68-3, enables AND gate 145 so as to enable address comparator 142. At this time, the stages of shift register 68 will contain the following, a parity bit in stage 68-2, an input enable bit in stage 68-3, the box address in the first four locations or stages of register 68-1, the card or peripheral address in the next four stages of register 68-1 and 8 bits of data in the next eight stages of register 68-1. The stage 68-4 will include the logical one indication of the mark bit.

The four bits of the box address are also received on line 144 at one input of address comparator 142 whose other input is coupled to receive the box address on bus 102. If there is a parity error as indicated by comparator 126 in response to the parity bit in stage 68-2 and the parity generated by generator 124, then address comparator 142 will be disabled. However, if in fact there is no disable signal and the mark bit in stage 68-4 indicates an enable condition, and should the box address on line 144 and the box address on line 102 compare, it being noted again that each of the interface boxes received the same information in their respective registers 68, then an enabling signal will be generated on line 146 so as to enable the data for example to be sent to the card addressed by means of AND gate 148. In order to enable the card address to be so sent to each of the cards or peripheral controllers attached to the interface box, AND gate 150 is enabled also in response to the signal on line 146. The strobe signal on line 146 is also utilized to enable AND gate 152 to send an input request signal to the receiving card and further is utilized to enable a strobe signal to be gated via AND gate 154 in response to the end clock signal on line 134 and in response to the output word signal on line 52 to the card addressed. Comparator 126 also generates the parity enable signal indicating a proper parity condition. The card addressed is accordingly provided with enabling signals such as input request, the strobe and parity enable signals so as to provide the data to the proper peripheral associated with the respective card address.

In order to control the input bus in association with the transmit logic, logic 66 is responsive to provide an input bus enable signal. The input bus enable signal is provided in response to the end clock signal as well as the priority signal on line 96 thereby enabling AND gate 160, which sets flip-flop 164, thus resulting in the input bus enable signal on line 162. The gap signal on line 90 is utilized for resetting flip-flops 56 and 58 and is generated by means of flip flop 166 which is set in response to a signal from AND gate 168 and in response to the logical one signal at the output of inverter 132 and a logical one signal at the output of one-shot multivibrator 118, thereby indicating a gap condition. Flip-flop 166 is reset thereafter.

Thus, in summary of the receive logic utilized in conjunction with each interface box of the present invention, by FIG. 4 there has been indicated input logic utilized for providing logical signals representative of the one- and zero- states, and apparatus for differentiating between the same as well as providing an indication that neither the one nor the zero state is indicated but that in fact a gap is indicated. This accordingly provides a distinction between the priority word and the output word between the cycles and subcycles. Thus, during a priority word, which is all logical ones, the interface box requesting priority will inform other lower priority boxes that it is the highest priority interrupt requesting device by transferring all logical zeroes during the priority word time. This condition will be utilized in conjunction with the transmit logic as shown in FIG. 5 for the next data transfer cycle. Thus, just before a priority word, the gap is indicated, the first bit or mark bit in shift register 68 is so indicated so as to indicate the highest priority interrupt requesting interface box which will be enabled to transfer data to the processor 10 during the next cycle of data transfer. When an output word time is indicated on line 52, then the data is also transferred into register 68 and the indication of the mark or stop bit in stage 68-4 of register 68 then allows the generation of gating pulses on line 146 so as to provide the data, etc. to the proper card corresponding to the addressed peripheral device. During the transmittal of the output word as well as the priority word during a data transfer cycle, input words are capable of being transferred to the processor as shall be seen with respect to FIG. 5.

Now referring to FIG. 5, there is shown the transmit logic for the same interface box that is shown in FIG. 4, namely, box 14-2. Coupled to the input of interface box 14-2 are the input lines 36-3 coupled to input logic 40-T and coupled to the output driver 48-T of interface box 14-2 are output lines 36-2. The ENABLE plus input of input logic 40-T is shown to be provided by means of NAND gate 200 which receives its two inputs from OR gate 202 and INPUT BUS ENABLE 162. This is different from the receive logic, wherein the ENABLE plus was preferably a fixed, always present voltage. During the priority word or the output word as indicated on lines 54 and 52, as derived from the logic of FIG. 4, OR gate 202 presents a logical one signal to one input of NAND gate 200 which is fully enabled upon generation of an input bus enable signal on line 162 for the highest priority requesting device. Full enabling of NAND gate 200 thereby disables the ENABLE plus signal so that no data can be received from any lower priority interface boxes. That is, the input logic of FIG. 3 is not activated so that the photoconductive elements 44 and 46 cannot pass data and accordingly bus 36 is open circuited at the point. However, during the gap time as indicated by the full enabling of NAND gate 200, and even though there is a higher priority interrupt requesting device, the ENABLE plus input to logic 40-T is so generated so as to enable the input logic 40-T to pass parity error information. Thus, if there is a parity error (during an output word), the processor 10 will be so notified so that corrective action may be taken. Such parity error is placed on the ONE- line of the interface boxes by means of AND gate 208 which has as one input the parity error signal and which has as another input the gap signal received from the receive logic of FIG. 4. Thus, the parity error may be transferred during gap time to the processor 10 from any one of the interface boxes whereas during the priority word time or output word time, the interrupt requesting highest priority device opens the data transfer path between the lower priority devices and the data processor 10.

During the gap time, the first and last stages 212-1 and 212-2 of shift register 212 are reset to indicate logical zeros and the 16 register 212-3 is enabled to receive bits in parallel from bus 214. The information on bus 214 includes four bits identifying the box address which as indicated in FIG. 4 may be supplied by means of logic levels generated by means of a thumbwheel switch or the like, and further, four bits identifying the card address, and eight bits of data to be transferred from the peripheral device to the data processor 10. This information is enabled into the 16 bits of register 212-3 upon the enabling of such register and finally upon the strobing of such information in response to the shift signal which is generated once during GAP time.

A shift signal is generated in response to the presence of an input bus enable signal on line 162 and the shift clock signal on line 115.

The shifting of bits through register 212 is accomplished as follows. Firstly, the first stage 212-1 is set to provide logical one signals into successive stages of register 212-3 and finally stage 212-2 each time bits of data are shifted out of stage 212-2 on line 240. This is accomplished by means of the plus voltage (+V) which is indicated as a mark bit so that in effect the shift pulse received by register 212 generates a logical one signal therefrom. The data is transferred on lines 240 and 241 to the input data control logic 242. The data is then transferred to the ONE- and ZERO- lines respectively so as to be sent to processor 10 via data path 36-2.

With the input bus enable signal on line 162 true and register empty detector 254 as indicated by a signal on line 255, not true, the data will be clocked by means of the signal on line 310 on the the ONE- or ZERO- lines through AND gate 300 and NAND gates 302 and 301 respectively. Thus when element 212-2, Q output, is at a logical one, both inputs to the gate 302 will be true resulting in line ONE- being not true. The complemented output line $\overline{Q}$ of flip-flop 212-2 is at logical zero which disables NAND gate 301.

When the register detector 254 is true, and the mark bit is in the START bit position 212-2, after 16 shift pulses, the output of the gate 303 will become true disabling gate 300 in the input data control logic 242 and enabling gate 309 in the input parity control logic 400. The output of the gate 309 will enable NAND gates 308 and 307 thereby routing both outputs (Q and $\overline{Q}$) of the flip-flop 306 to the ONE- and ZERO- lines. Flip-flop 306 toggles, depending upon the state of the data appearing on line 243. The input clock generated via O.S. M.V. 305 will be inhibited by the $\overline{Q}$ line from flip flop 304 which becomes set after the parity bit is transmitted by means of logic 400.

As indicated hereinbefore, the first stage 212-1 of shift register 212 is utilized to provide logical ones to each of the stages of register 212-3 in addition to the last stage or start bit 212-2. When each of the 16 bits or stages of register 212-3 includes a logical one signal therein, register empty detector will detect this when the start bit in stage 212-2 also equals a logical one thereby enabling the register empty detector 254.

Thus, in summary of the operation of the transmit logic of FIG. 5, and with respect to the highest priority interrupt requesting device, the input logic 40-T thereof is disabled so that lower priority device cannot transfer data to the processor 10. Further, parity error is allowed to be transferred to the processor 10 during the gap time so that any necessary correction may be initiated by processor 10. Further, it has been noted that the shift register 212 is coupled to receive 16 bits in parallel, such bits including the interface box address, i.e. peripheral address, and the data, which are in turn transferred to bit by bit interface 12-1 as they are shifted out of register 212. This shifting is disabled when the register empty detector detects that register 212-3 is empty. Finally, the serially received bits are transferred to processor 10 in parallel i.e., word four, via the conversion which takes place in interface 12-1.

There has accordingly been seen a system coupled with a processor including a plurality of interface boxes each coupled with one or more peripheral devices so as to transfer data therebetween. There has also been shown a feature of the invention wherein such interface boxes are coupled in a full duplex serial or daisy chained path with such processor so as to enable the transfer of input words to such processor and to receive an output word and a priority word from such processor for use thereby. It has also been seen that priority determination has been made so as to increase the throughput of the system by determining such priority in a data transfer cycle just prior to the data transfer affected. It has also been seen that such system has been implemented in a simple and fairly inexpensive manner by utilizing signals of three states, including a gap signal, so as to separate the words being transferred.

Having described the invention, what is claimed as new and novel and for which it is desired to secure Letters Patent is:

1. A data processing system comprising:

A. a data processor;

B. a plurality of peripheral interface boxes;

C. full duplex coupling means serially coupled between said data processor and said plurality of boxes in order to provide for the transfer of data between said data processor and at least one of said boxes, said transfer of data repetitively occurring in cycles during each of which cycles an output word is capable of being transferred and a priority word is transferred from said processor and two input words are capable of being transferred to said processor;

D. means, responsive to said priority word and included in each of said boxes, for determining the box which will be allowed to transfer data with said processor during the next one of said cycles;

E. means, included in each of said boxes, for enabling said box so determined to transfer data with said processor during said next one of said cycles.

2. A system as in claim 1 wherein said means for enabling comprises means for transmitting at least one of said input words to said processor and wherein said system further comprises:

A. means for receiving said output word in each of said boxes;
B. means for determining the box for which said output word is intended;
C. at least one peripheral unit coupled with each of said boxes; and D. means for transferring said output word from said box so determined to said at least one peripheral unit.

3. A system as in claim 2 wherein said box so determined is coupled to a plurality of peripheral units and further comprising:

A. means for determining the one of said plurality of peripheral units for which said output word is intended; and
B. means for transferring said output word from said box so determined to said peripheral unit so determined.

4. A system as in claim 2 further comprising:

A. first interface means coupled between said processor and said coupling means for converting said words received from said processor from parallel by bit form to serial by bit form; and
B. second interface means coupled between processor and said coupling means for converting said words received from said interface boxes from serial by bit form to parallel by bit form.

5. A data processing system comprising:

A. a data processor;
B. a plurality of peripheral units;
C. a plurality of peripheral interface boxes;
D. means for coupling each of said boxes for bidirectional transfer of data with one or more of said peripheral units;
E. bus means for coupling said data processor in a serial, daisy chained manner with each of said boxes so that the box furthest away from said processor on said bus means has the lowest priority of said boxes, said bus means including
   1. an input bus coupled to receive data from said boxes for transfer to said processor, and
   2. an output bus coupled to receive data from said processor for transfer to said boxes;
F. means, included in each of said boxes, for receiving, during each of successive intervals of time, data from said output bus in the form of an output word and a priority word;
G. first means, included in each of said boxes, for enabling the transfer, during each of said successive intervals of time, data to said input bus in the form of two input words;
H. means, included in each of said boxes, for generating an interrupt request;
I. means, included in each of said boxes, for detecting, during the time said priority word is being transferred, the highest priority interrupt requesting interface box; and
J. second means, included in each of said boxes, for enabling said highest priority interrupt requesting box so determined, to transfer at least one input word to said processor during the next succeeding one of said successive intervals of time.

6. A system as in claim 5 further comprising means for providing each of said words on said busses in serial by bit form, a bit of a first logical state represented by a first polarity current, a bit of a second logical state represented by a second polarity current, and no current representing a gap, said gap occurring between each of said intervals of time and between the transfer of said output word and said priority word.

7. A system as in claim 6 wherein each of said interface boxes comprises:

A. receive logic for receiving data from said processor;
B. transmit logic for transmitting data to said processor; and wherein
C. said receive logic and said transmit logic each include
   1. input logic for converting said first and second polarity currents received on said busses to first and second logical state signals respectively; and
   2. output logic for converting first and second logical state signals provided by said boxes to first and second polarity currents respectively for transfer over said busses.

8. A system as in claim 7 wherein said input logic comprises:

A. impedance matching means coupled to receive the respective bus;
B. first isolator means; and
C. second isolator means, said first and second isolator means operative to generate the respective one of said logical state signals in response to the respective currents received from the respective one of said busses by means of said impedance matching means.

9. A system as in claim 7 wherein said receive logic comprises:

A. means for detecting the transfer of an output word from said processor; and
B. means, responsive to the detection of the transfer of said output word, for enabling the transfer of said output word from said input logic to said output logic and serially through the respective interface boxes so that each of said boxes receives said output word.

10. A system as in claim 9 wherein said receive logic further comprises:

A. a shift register;
B. means, responsive to the detection of the transfer of said output word, for shifting said output word into said shift register;
C. means for indicating the one of said interface boxes for which said output word is intended; and
D. means for transferring a portion of the contents of said output word from the intended one of said boxes to one of said peripheral units.

11. A system as in claim 10 wherein said receive logic further comprises:

A. means for checking the parity of said output word received in said shift register; and
B. means for disabling the transfer of said output word to said one of said peripheral units if said parity is incorrect.

12. A system as in claim 11 wherein said receive logic further comprises:

A. means, responsive to the absence of either said first or second polarity current, for generating a gap signal; and
B. means, responsive to said gap signal, for distinguishing between said successive intervals of time.

13. A system as in claim 12 wherein said receive logic further comprises means, responsive to said gap signal, for distinguishing between said output word and said priority word.

14. A system as in claim 7 wherein said transmit logic comprises:

A. a shift register;

B. means for loading data in bit parallel form from one of said peripheral units into said shift register; and C. means, responsive to the transfer of either an output word or a priority word for shifting said data from said register so as to provide said data as one of said input words to said processor.

15. A system as in claim 14 wherein said transmit logic further comprises:

A. means for detecting a gap condition; and

B. means, responsive to said gap condition, for enabling an error condition to be transferred to said processor from any one of said interface boxes.

16. A system as in claim 14 wherein said transmit logic further comprises means, included in said second means for enabling and responsive to said gap condition, for disabling or open circuiting said input bus between said highest priority interrupt requesting box and the other ones of said boxes further away on said input bus from said processor, so that said highest priority interrupt requesting box may transfer at least one input word to said processor during said next successive interval of time.

17. A system as in claim 5 wherein said priority word as received from said processor has a first signal state and further comprising means, included in each of said interface boxes, for changing said first signal state of said priority word to a second signal state, said changing of said first state to said second state occurring only in said highest priority interrupt requesting interface box, wherein said second signal state indicates to the ones of said boxes further away on said bus that another interface box has priority for data transfer with said processor.

* * * * *